May 20, 1969     H. D. SNIVELY     3,445,703
COMBINED CAST RISERS AND INVOLUTED EQUALIZERS
Filed Dec. 6, 1965     Sheet 1 of 2

INVENTOR.
HOWARD D. SNIVELY
BY *James C. Davis Jr.*
HIS ATTORNEY

INVENTOR.
HOWARD D. SNIVELY
BY *James C. Davis Jr.*
HIS ATTORNEY

United States Patent Office 3,445,703
Patented May 20, 1969

3,445,703
COMBINED CAST RISERS AND INVOLUTED EQUALIZERS
Howard D. Snively, Schenectady, N.Y., assignor to General Electric Company, a corporation of New York
Filed Dec. 6, 1965, Ser. No. 511,950
Int. Cl. H02k 3/38, 5/08
U.S. Cl. 310—204      3 Claims

ABSTRACT OF THE DISCLOSURE

Combined cast risers and involuted equalizers have the riser assembly divided into a plurality of integral segments, each having a plurality of riser conductors compacted and supported in a rigid body of resinous insulating material. The segment is, in turn, rigidly secured to the rotor, preferably by a bolt received through a bolt-receiving aperture integrally formed in the resinous material. This provides a rigid central support for the riser assembly and also suitable protective insulation. The individual riser conductors are compactly stacked along their central portions within the insulating material to provide large unobstructed coolant passages between the individual segments. The riser conductors have circumferentially offset radially inner and outer extremities.

---

The present invention pertains generally to direct current, or D-C, dynamoelectric machines and, more particularly, relates to combined commutator and equalizer connections for lap wound machines of this kind.

It is oftentimes advantageous and not infrequently required that the armature conductors of a D-C dynamoelectric machine be wound in what is known in the art as a lap, or multiple, winding consruction. The lap wound construction features a large number of parallel current paths and is found mostly in large capacity machines having a relatively low voltage and high current rating. For example, D-C machines having a continuous armature current rating in excess of 500 amperes or a power output in excess of 150 kilowatts can usually be expected to benefit from or require a lap winding.

It is natural to assume that the voltages induced in the many parallel paths of a lap wound machine are equal, but this assumption is seldom true. Instead, objectionably large circulating currents can be expected in the windings and through the brushes in the absence of some kind of equalizing means. Such circulating currents are ordinarily large and detract from the useful current capacity of the machine.

Equalization of generated voltage is accomplished by interconnecting selected groups of armature conductors which are similarly situated relative to poles of like polarity. The use of equalizer connections prevents circulating currents in the selected groups from interfering with good commutation by passing through the brushes and at the same time establishes a counteracting electromagnetic flux under the poles tending to restore balanced generated voltages, all as well known to those skilled in the art.

The most common equalizer means heretofore used in machines of the larger sizes to which this invention is principally directed is known as the helical equalizer. The helical equalizer assembly comprises a plurality of conductors, nested under the end turns or behind the usual commutator connections, interconnecting selected armature conductors similarly situated with respect to poles of like polarity. Usually at least one armature bar per rotor slot is tied into the helical equalizer network. Some disadvantages of helical equalizers are that they require a large number of additional conductors and connections, the conductors must be insulated to withstand full machine voltage, the assembly is almost always under something else and not accessible for repair, and desirable air passages are thereby restricted.

Equalization also has been achieved heretofore by what is aptly known in the art as an involved equalizer construction. In a common involuted equalizer construction two commutator risers diverge from each commutator bar and are connected respectively to armature conductors circumferentially spaced by two-pole spans, i.e., conductors similarly situated with respect to poles of like polarity which are desirably equipotential points in the winding. The chief reason the involuted equalizer is so rarely used in spite of its excellent electrical characteristics and economy of conductors and connections is suggested by its name. The completed structure is an intricate design of two rows of reversely slanted, closely spaced conductors that must be insulated for full machine voltage. Attempts to provide a rigid central support for the risers have been largely unsuccessful and the assembly generally chokes off the desirable coolant passage between the commutator and rotor core, particularly after the many small interstices and crevices therein have been filled by contaminants present in the usual operating environment.

Accordingly, it is a principal object of this invention to provide improved equalization means for a dynamoelectric machine.

Another object of this invention is to provide a dynamoelectric machine having an involuted equalizer construction that obviates disadvantages of prior constructions of this general kind.

Briefly, the foregoing objects and others that will become apparent are achieved in accord with on aspect of the present invention by providing an involute equalizer construction wherein the riser assembly is divided into a plurality of integral segments, each having a plurality of riser conductors compacted and supported in a rigid body of resinous insulating material. The segment is, in turn, rigidly secured to the rotor, preferably by a bolt received through a bolt-receiving aperture integrally formed in the resinous material. In this way, a rigid central support for the riser asembly is provided and suitable protective insulation achieved. By compactly stacking the individual riser conductors along their central portions within the insulating material body, relatively large unobstructed coolant passages are provided between the individual segments.

For a better and more complete understanding of the invention, reference should now be had to the following specification and to the accompanying drawings in which.

Figure 1:
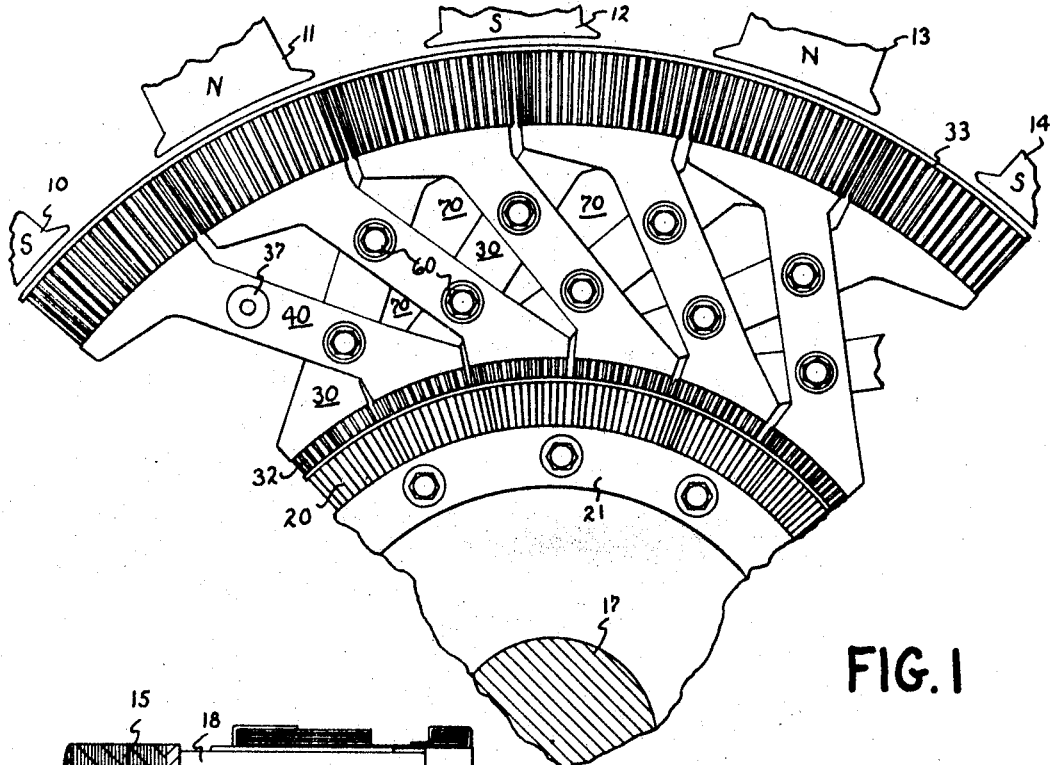
FIGURE 1 is a partial end view of a riser assembly in accord with the invention.

The dynamoelectric machine illustrated in FIGURE 1 is a D-C commutator kind that can serve equally advantageously as a motor to provide rotary mechanical power or as a generator to provide electric power. Indeed, the same machine is frequently called upon to serve both functions alternatively; for example, a motor oftentimes changes roles to provide dynamic braking. The machine includes a stator, or relatively stationary member, represented by poles 10–14 of alternating polarity circumferentially spaced by equal angular pole spans and defining with their respective pole faces a rotor-receiving bore in the stator. It is understood that while only the pole shoes are shown, each is attached to a pole core supported in a field yoke that also provides a return magnetic path interconnecting the poles. Suitable field coils are most commonly disposed about the pole cores and provide appropriate excitation. It is also understood that interpoles, or commutating poles (not shown) are customarily disposed between the main poles illustrated.

Figure 2:
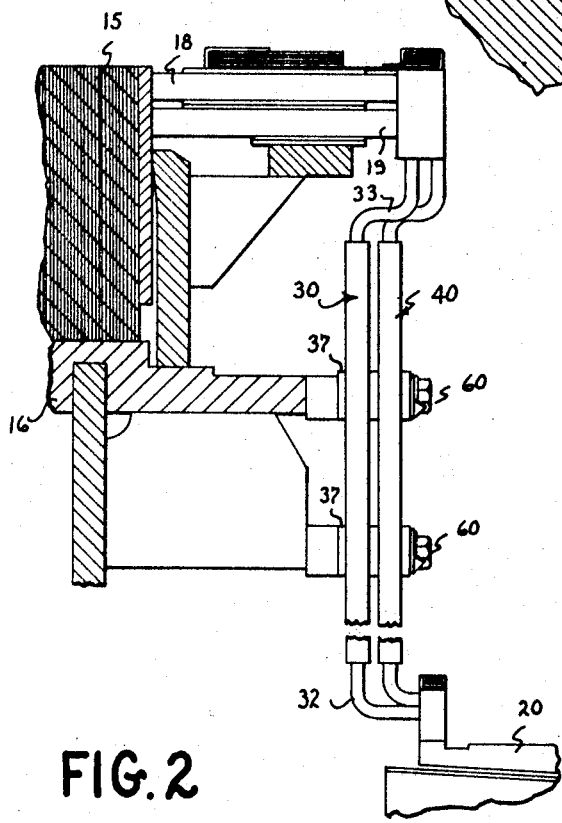
FIGURE 2 is a partial side view of a riser assembly in accord with the invention.

Referring additionally to FIGURE 2, the dynamoelectric machine also includes a rotor journaled for rotation within the stator bore and having an annular stack 15 of magnetic laminations, or punchings, carried by a central spider 16 that is, in turn, supported by the journaled shaft 17. A plurality of insulated, axially extending armature conductors, as 18 and 19, are circumferentially spaced about the periphery, or armature core, of stack 15 and provide the active coil sides for the armature of the machine.

The remaining basic structural component of the machine illustrated is the commutator which comprises a plurality of conductive wedge-shaped commutator bars 20 circumferentially spaced and separated by insulating spacers to provide a drum-like body secured in place, for example, with the aid of a commutator clamping ring 21. It will be understood that brushes and suitable brush holder fixtures would be used, but have been omitted from the drawings in the interest of more clearly depicting the invention.

The foregoing description has been given to establish one suitable background for the present invention and the various details of construction and methods of operation of machines of the kind described so far are familiar to those skilled in the art. Accordingly, in the interest of avoiding possible confusion by protracted discussion of well-known prior art, attention will now be focused upon a principal feature of the present invention, namely, the means for effecting suitable connection of the commutator bars to corresponding armature conductors at the front, or commutator end, of the rotor. Such means are known generically in the art as a riser assembly.

Figure 3:
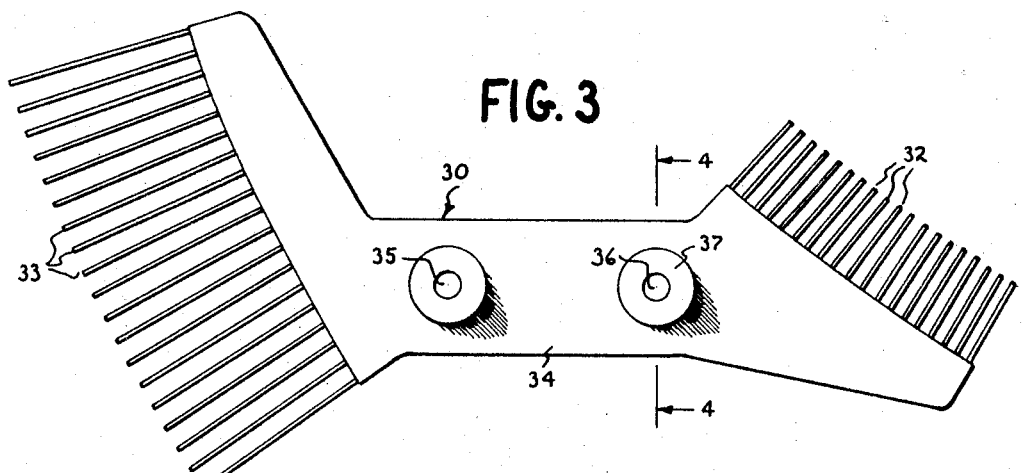
FIGURE 3 is a plan view of one riser segment suitable for use in accord with the present invention.
Figure 4:
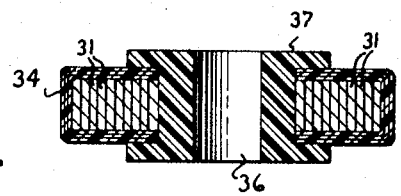
FIGURE 4 is an enlarged cross-section view of the segment of FIGURE 3 taken along lines 4—4.

In the presently preferred embodiment of this invention, the riser assembly comprises a plurality of integral riser segments 30 and 40. A typical riser segment 30 is generally shown in FIGURE 3. Each riser segment includes an array of insulated riser conductors 31 in closely stacked relationship adjacent their central portions, as best seen in the cross-sectional view of FIGURE 4. Only a very thin separation, preferably effected by insulation wrapping, is required in the illustrative embodiment for individual conductors 31 because the difference in potential between adjacent conductors is usually only from 15 to 20 volts. The riser conductors are fanned out, or circumferentially spaced apart, adjacent their radially inner extremities 32 and their radially outer extremities 33 to provide spacings advantageously corresponding to the circumferential spacings of successive commutator bars 20 and armature conductors, as 18 or 19, respectively, which are to be connected.

An integral body 34, conveniently fabricated at least in part of a rigid resinous insulating material, for example, any of a number of suitable epoxy compounds commonly used for end turn support and the like, surrounds and supports the riser conductors 31 at least along the central portions thereof which are compacted. Preferably, however, integral body 34 extends beyond the central portion, both radially inwardly and outwardly, as shown, to provide additional structural support to the fanned out portions of the riser segment.

Means are advantageously provided integral with body 34 for securing riser segment 30 to the rotor, conveniently rotor spider 16 or a structural extension thereof. In the illustrative embodiment such means take the form of bolt-receiving apertures 35 and 36 through body 34. The apertures can be formed by cuffed sleeves of solid insulating material, as sleeve 37 in FIGURE 4, that are cast into body 34 during fabrication of segment 30 or, alternatively, apertures 35 and 36 can be molded directly in the material of body 34. Of course, more or fewer integral securing means can be provided and the desirability of so doing will depend chiefly upon the length of the riser conductors 31 and their structural properties when combined with the rigid resinous body 34.

In the embodiment illustrated the inner radial extremities 32 of riser conductors 31, that are connected to respective commutator bars 20, as by brazing, soldering, welding or the like thereto, are circumferentially offset from the radially outer extremities 33, that are connected in like manner to respective armature conductors, by an amount substantially equal to, and preferably exactly equal to, one-pole span. A pole span as used herein and in the appended claims is the angular distance between adjacent main pole centers in a plane perpendicular to the rotor axis.

In this way, fabrication of a riser assembly having a first annular row spaced axially outward from the first row and having segments 40 that are the reverse image of segments 30, completes the advantageous involute equalizer kind of riser connections. The term reverse image is used herein and in the appended claims to specify that the circumferential offsets of segments so distinguished are in opposite directions, that is to say, one is offset in the counterclockwise direction, whereas the other is offset in the clockwise direction as viewed from the same radial end of the segments.

From the point of view of fabrication, it is preferable to have the segments in each row identical before installation except for the axial direction in which the extremities 32 and 33 are bent. The latter forming can be readily accomplished after the more intricate fabrication and resinous casting or molding step is performed. For these and other reasons that will be apparent, the offset is selected to be the same for each row, namely, one-pole span, although the equalizing function is achieved whenever the total offset of the inner and outer extremities of the riser conductors is equal to any even number of pole spans and does not require equal offsets.

Figure 5:
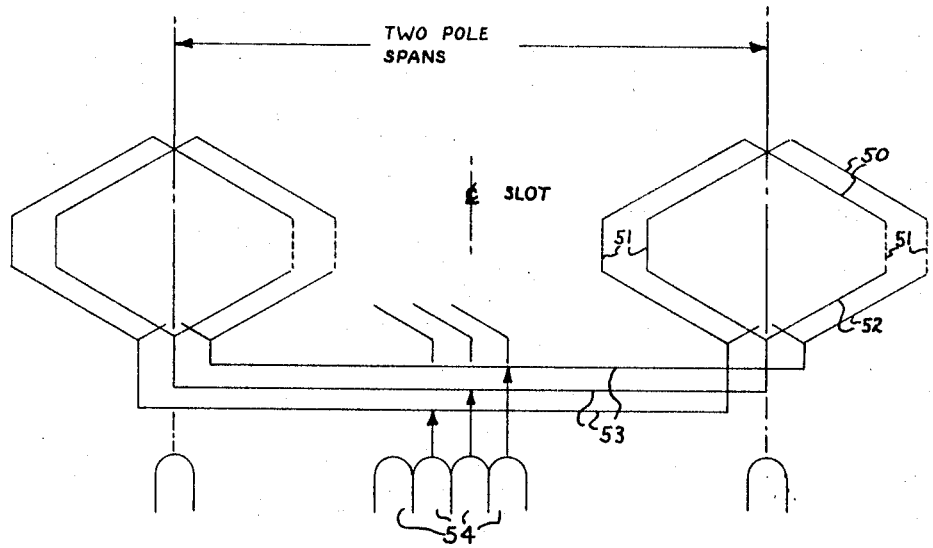
FIGURE 5 is a partial winding diagram for a typical dynamoelectric machine featuring this invention.

As best seen in FIGURE 1, the fanned out portions of segments 30 and 40 overlap to provide riser conductor extremities that are approximately in axial alignment. The conductor pairs thus defined are connected together to a common commutator bar or conductor end turn depending upon whether the extremities are radially inner or outer, respectively. Because each pair of connected segments is reversely offset by one-pole span, an equalizer connection is effected in the assembly shown wherein armature conductors similarly situated with respect to different poles of like polarity are interconnected. Inasmuch as winding connections do not lend themselves to clear presentation in pictorial form and so many well-known techniques are suitable, this detail is omitted in FIGURE 1 and replaced by a typical developed winding as shown in the partial schematic diagram of FIGURE 5, wherein 50 denotes back end turns, 51 the active coil sides, 52 the coil leads, 53 the riser conductors, and 54 the commutator segments. The dashed-line active coil sides, or inductors, 51 are in the bottom of the slot, as conductor 19 in FIGURE 2, whereas the solid-line coil sides 51 are in the top of the slot, as conductor 18. There would commonly be one axial row of commutator brushes (not shown) per pole.

It is seen in FIGURES 1 and 2 that a plurality of bolts, as 60, passing through the integral apertures in segments 30 and 40 rigidly secure the segments to rotor spider 16 through structural extensions thereof. Another advantage in providing reverse image segments 30 and 40 is seen to be that the various apertures can readily be positioned in the segments to align in pairs. The two annular rows of segments are preferably slightly axially spaced, as shown in FIGURE 2, for enhanced cooling thereof as well as for better circulation in the normally troublesome area of the end turns. The relatively wide axial passages through the riser assembly, as 70, are best seen in FIGURE 1.

An additional advantage gained by using the integral offset riser segments of this invention is that the riser conductors are each of substantially equal length so that they can all be provided in one economical cutting operation. A typical maximum deviation in length within a segment is less than 10 percent. Thus, a final trimming operation is economical. The construction of this invention differs markedly in this respect, as well as in mechanical soundness, from one previous approach that featured radially extending wrapped bundles of riser conductors wherein a great number of conductors of greatly differing lengths were employed.

While it is preferred that the central portions of the riser segments in the inner and outer rows be reversely skewed, or tilted at an angle, relative to a plane through the central axis of the rotor, in the interest of a more rigid construction that also conserves riser conductor material, as shown, those skilled in the art will readily appreciate that the central portions of the segments can extend radially equally well in those cases where such considerations are less important, for example, in machines having a shorter radial distance between the commutator segments and armature conductors.

In the illustrative embodiment there are three segments per pole in the total riser assembly; however, this can vary from one machine to the next. Also, in some cases more than two rows of segments are desirable in a riser assembly in accord with this invention.

In the interest of minimizing the inter-insulation requirements of riser conductors, it is preferable to dispose the riser conductors in closely stacked relationship in one plane with adjacent conductors connected to adjacent commutator segments; however, two or more axially spaced rows of riser conductors can be used within each integral segment, particularly when an even more compact assembly is required, for example, to even less restrict axial coolant flow.

There has been set forth herein a highly advantageous riser assembly, of the involuted equalizer kind, that is readily fabricated, mechanically sound and which provides axially extending ventilation openings therethrough to permit optimum cooling. According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

What I claim as new and desire to secure by Letters Patent of the United States is:

1. In a dynamoelectric machine including, a stator with a bore having main field poles of alternating polarity circumferentially spaced thereabout with equal angular pole spans, a rotor journaled for rotation within said bore and having a plurality of axially extending armature conductors circumferentially spaced about the periphery thereof, and a commutator rotatable with said rotor and having a plurality of circumferentially spaced insulated commutator bars, the improvement of a commutator riser assembly effecting involuted equalizer connection of said commutator bars to corresponding ones of said armature conductors adjacent one end of said rotor, said riser assembly comprising: a plurality of riser segments each including an array of riser conductors in closely stacked relationship adjacent their central portions, said riser conductors having circumferentially offset radially inner and outer extremities an angular amount substantially equal to one of said equal angular pole spans, and, an integral body of rigid insulating material surrounding and supporting said riser conductors at least along the central portions thereof.

2. The riser assembly of claim 1 comprising first and second axially spaced annular rows of said integral riser segments with the segments of the second row being shaped like the reverse image of the segments in the first row wherein the central portions of segments in said first and second row are reversely skewed relative to a plane through the central axis of said rotor.

3. The riser assembly of claim 1 comprising first and second axially spaced annular rows of said integral riser segments with the segments of the second row being shaped like the reverse image of the segments in the first row wherein corresponding riser conductors from said first and second rows of segments are connected together adjacent their inner extremities and to a common commutator bar to effect connection between armature conductors similarly situated with respect to different poles of like polarity.

References Cited

UNITED STATES PATENTS 3,274,413  9/1966  Adriance _____ 310—234
3,353,041  11/1967  Little _____ 310—43

MILTON O. HIRSHFIELD, *Primary Examiner.*

D. F. DUGGAN, *Assistant Examiner.*

U.S. Cl. X.R.

310—234